Patented Dec. 27, 1932

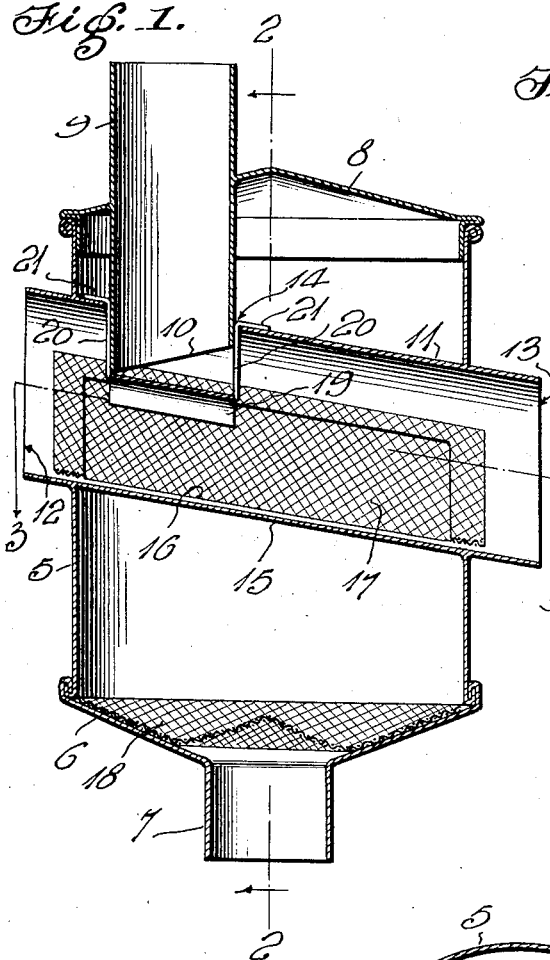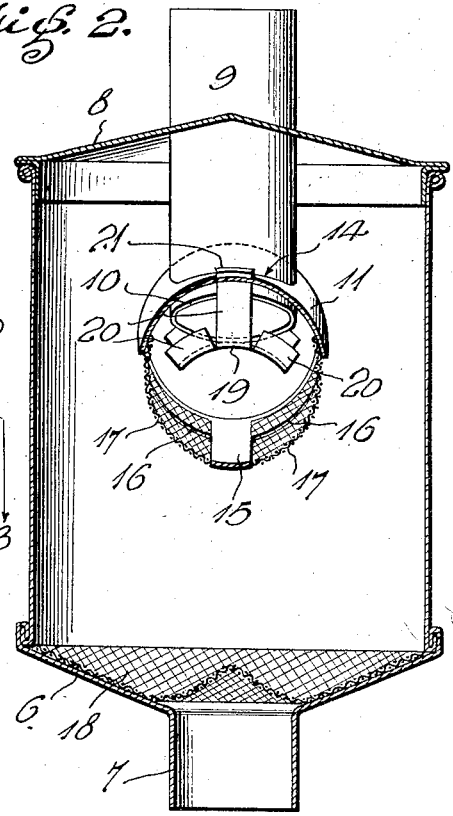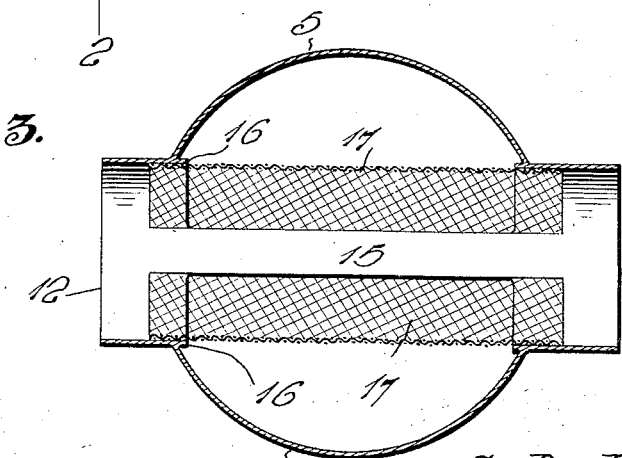

1,892,039

UNITED STATES PATENT OFFICE

CLARENCE BAYLESS DEMAREE, OF EMINENCE, KENTUCKY, ASSIGNOR OF ONE-HALF TO JOSEPH HUGHES RUCKER, OF LAWRENCEBURG, KENTUCKY

CISTERN FILTER

Application filed November 30, 1931. Serial No. 578,102.

The invention relates to an improved cistern filter of the general type shown in my U. S. Patent 1,559,941 of November 3, 1925.

One object of the invention is to provide an improved structure in which the incoming water is spread more uniformly over the screen which removes trash and the like therefrom.

Another aim is to so construct the tube which receives the incoming water, as to minimize the danger of its screen becoming clogged.

A still further aim is to provide a structure in which an additional water supply pipe may be connected with the upper end of the screened tube, if desired.

With the foregoing in view, the invention resides in the novel subject matter hereinafter described and claimed, description being accomplished by reference to the accompanying drawing.

Fig. 1 is a vertical sectional view through a filter constructed in accordance with the invention.

Fig. 2 is a second vertical sectional view on line 2—2 of Fig. 1.

Fig. 3 is a horizontal sectional view on line 3—3 of Fig. 1.

In the drawing above briefly described, the numeral 5 denotes a casing preferably in the form of a vertically disposed cylinder, said casing having a bottom 6 provided with a clean water outlet 7 from which a pipe may extend to a cistern or the like. The upper end of the casing 5 is provided with a top 8 which is preferably removable. Passing through and rigidly secured in an opening in this top is a vertical water admission pipe 9 which projects downwardly from said top, the lower end 10 of said pipe 9 being preferably cut in an inclined plane.

A water-receiving tube 11 extends across the upper portion of the casing 5 and preferably inclines in the opposite direction from the end 10 of the pipe 9, said tube 11 having both of its ends 12 and 13, open. To the upper end 12, an additional water-conducting pipe (not shown) may be connected, and a waste pipe (not shown) is preferably engaged with the end 13 to carry the trash-laden waste water to any desired point. The upper side of the tube 11 is provided with an opening 14 through which the lower end of the water admission pipe 9 projects, the central longitudinal portion 15 at the lower side of said tube is smooth and imperforate, and two water-discharge openings 16 are formed in said lower portion of the tube at opposite sides of said imperforate portion 15, said openings 16 being provided with appropriate screens 17. Another screen 18 is preferably located in the lower end of the casing 5, over the outlet 7, acting as an additional guard to hold back small particles of foreign matter which might otherwise descend to the cistern or the like.

A water spreader 19 is disposed under the pipe 9, within the tube 11, said spreader being preferably in the form of a transversely arched sheet metal plate inclined in the same direction as said pipe 11, the upper and lower ends of said plate being provided with upstanding flanges 20 which direct the incoming water laterally upon the screens 17. The upper and lower ends of the spreader 19 are provided also with upwardly projecting arms 20 which pass through the opening 14, between the edge wall of the latter and the pipe 9, the upper ends of said arms having lateral fingers 21 which lie upon the upper side of the tube 11. As long as pipe 9 and cover 8 remain in position, the former holds the spreader 19 in proper place, but if desired for repair or cleaning purposes, said pipe 9 and cover 8 may be removed, whereupon the arms 20 may be bent inwardly, allowing removal of the spreader 19.

All water entering the filter through the pipe 9, is laterally spread by the spreader 19 and most of this water flows through the screens 17 and 18 and travels on to the cistern or the like, whereas some of the water will discharge through the tube 11, carrying any trash held back by the screens 17. A second water admission pipe may be connected with the upper end 12 of the tube 11 if desired, but otherwise, said end may be plugged or otherwise closed.

Whenever it is desired to divert all of the water from the cistern or the like, an appropriate valve of more or less conventional form may be inserted into the tube 11 to close its openings 16. As no patentable novelty is claimed for this valve, it has not been illustrated.

By employing the spreader 19 and consequently discharging the incoming water laterally onto the screens 17, said water has less tendency to force any foreign matter which it carries, into the meshes of said screens, and such foreign matter may gravitate onto the imperforate portion 15 of the tube 11 and readily slide from the latter.

It will be seen from the foregoing that a simple and inexpensive, yet an efficient and desirable filter has been provided, one which is less liable to clogging than if constructed as in the patent above mentioned, and one which may be readily cleaned whenever necessary.

While the details disclosed are preferably followed, variations may be made within the scope of the invention as claimed.

I claim:—

1. A filter comprising a casing having a top and a bottom and a clean water discharge in the latter, a water-receiving tube extending across the interior of said casing, said tube being inclined and having at least its lower end open, the central longitudinal portion of the tube bottom being smooth and imperforate and the lower portion of the tube being provided with water discharge openings at opposite sides of said imperforate portion, screens for said openings, a water admission pipe projecting downwardly from the casing top and discharging into the upper portion of said tube, and a water spreader disposed within said tube under said water admission pipe, said spreader being transversely arched and having upstanding flanges at its ends extending transversely of said tube, whereby said spreader will direct the incoming water laterally onto the two screens.

2. A filter comprising a casing having a top and a bottom, the latter being provided with a clean water outlet, an inclined waste tube extending across said casing and having a screened lower portion, the upper side of said tube being provided with an opening, a water spreader within said tube under said opening, said spreader being provided with upwardly projecting arms extending through said opening, the upper ends of said arms being provided with outwardly projecting fingers lying upon said tube, and a water inlet pipe projecting downwardly from said casing top and received in said opening, said water inlet pipe holding said arms engaged with the edge wall of said opening.

3. A filter comprising a casing having a top and a bottom, the latter being provided with a clean water outlet, an inclined waste tube extending across said casing and having a central longitudinal imperforate portion at its lower side, a water inlet opening in its upper side and two screened water discharge openings along the edges of said central longitudinal imperforate portion, and a water inlet pipe extending downwardly from said casing top into said water inlet opening.

In testimony whereof I affix my signature.

CLARENCE BAYLESS DEMAREE.